(12) United States Patent
Chen et al.

(10) Patent No.: US 9,569,036 B2
(45) Date of Patent: Feb. 14, 2017

(54) MULTI-TOUCH SYSTEM AND METHOD FOR PROCESSING MULTI-TOUCH SIGNAL

(71) Applicant: Wistron Corporation, New Taipei (TW)

(72) Inventors: Yu-Yen Chen, New Taipei (TW); Po-Liang Huang, New Taipei (TW); Chia-Jui Liu, New Taipei (TW); Kuo Hsing Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/938,240

(22) Filed: Jul. 10, 2013

(65) Prior Publication Data
US 2014/0368448 A1 Dec. 18, 2014

(30) Foreign Application Priority Data

Jun. 13, 2013 (TW) .............................. 102120926 A

(51) Int. Cl.
*G06F 3/042* (2006.01)
*G06F 3/041* (2006.01)

(52) U.S. Cl.
CPC ........... *G06F 3/0421* (2013.01); *G06F 3/0416* (2013.01); *G06F 2203/04106* (2013.01)

(58) Field of Classification Search
CPC ................. G06F 3/042–3/0428; G06F 3/0488; G06F 3/04886; G06F 2203/04104; G06F 2203/04808; G06F 2203/04109
See application file for complete search history.

(56) References Cited

U.S. PATENT DOCUMENTS

| | | | | |
|---|---|---|---|---|
| 6,118,433 A | * | 9/2000 | Jenkin et al. | 345/173 |
| 8,525,799 B1 | * | 9/2013 | Grivna et al. | 345/173 |
| 2003/0156332 A1 | * | 8/2003 | Seino et al. | 359/627 |
| 2009/0189878 A1 | * | 7/2009 | Goertz et al. | 345/175 |
| 2009/0256810 A1 | * | 10/2009 | Pasquariello | 345/173 |
| 2010/0090979 A1 | | 4/2010 | Bae | |

(Continued)

FOREIGN PATENT DOCUMENTS

| | | | |
|---|---|---|---|
| CN | 102880354 | | 1/2013 |
| CN | 202815792 | * | 3/2013 |

OTHER PUBLICATIONS

English language translation of CN202815792; published Mar. 20, 2013.*

(Continued)

*Primary Examiner* — Nalini Mummalaneni
(74) *Attorney, Agent, or Firm* — Jianq Chyun IP Office

(57) ABSTRACT

A multi-touch system is provided. In the multi-touch system, there is a plurality of touch sensing sub-systems. The touch sensing sub-systems are arranged in a touch sensing row in sequence and the touch sensing row has a pair of longitudinal sides opposite to each other and a pair of end sides opposite to each other. A light reflective frame is configured on one of the longitudinal sides and both of the end sides. Each of the touch sensing sub-systems comprises at least two sensors arranged at two corners of the corresponding touch sensing sub-system at one longitudinal side opposite to the other longitudinal side having the light reflective frame arranged thereon. A sensing range of both of the sensor covers the corresponding touch sensing sub-system.

9 Claims, 5 Drawing Sheets

(56) References Cited

U.S. PATENT DOCUMENTS

| | | | |
|---|---|---|---|
| 2012/0218215 A1* | 8/2012 | Kleinert et al. | 345/173 |
| 2013/0016069 A1 | 1/2013 | Chen et al. | |
| 2013/0278563 A1* | 10/2013 | Chang | G06F 3/0416 345/175 |
| 2014/0152624 A1* | 6/2014 | Piot | G06F 3/042 345/175 |

OTHER PUBLICATIONS

"Office Action of Taiwan Counterpart Application", with partial translation, issued on Feb. 13, 2015, p. 1-p. 5, in which the listed reference was cited.

"Office Action of China Counterpart Application" with partial English translation, issued on Sep. 5, 2016, p. 1-p. 21, in which the listed references were cited.

* cited by examiner

MULTI-TOUCH SYSTEM AND METHOD FOR PROCESSING MULTI-TOUCH SIGNAL

CROSS-REFERENCE TO RELATED APPLICATION

This application claims the priority benefit of Taiwan application serial no. 102120926, filed on Jun. 13, 2013. The entirety of the above-mentioned patent application is hereby incorporated by reference herein and made a part of this specification.

BACKGROUND OF THE INVENTION

Field of Invention

The present invention relates to a touch sensing system and a signal operation method of the same. More particularly, the present invention relates to an extended-type multi-touch system and a signal operation of the system.

Description of Related Art

Recently, the touch-sensing electronic products are beloved by the consumers and are gradually become the main tendency because of their ease to be operated and their user intuition operation. Among the conventional resistive touch screen, capacitive touch screen, and rear projection touch screen, the touch efficiency of the capacitive touch screen is better but the cost of the capacitive touch screen is more expensive. Further, with the increasing of the size of the screen, the application of the capacitive touch screen is limited. To pursue the substitution for the capacitive touch screen, currently, an optical touch screen using optical element for detecting touched position is developed and it possesses the advantages of low coast and high accuracy which make it on a relatively vantage position in the highly competitive market. Therefore, it becomes another options for large-size touch screen.

The conventional optical touch screen utilizes at least two sensors each of which is composed of an image sensing unit and a light emission unit and which are configured at the periphery or the corners of the screen. Moreover, the light reflective frames are configured on the periphery of the screen. The light emission units radiate the light onto the light reflective frames and the image sensing units capture the light-and-shade status of the light reflective light from the light reflective frames so that whether there is a physical object on the screen can be determined and the position of the physical object can be calculated as well. However, the size of the conventional touch screen cannot be enlarged over 100 inches or, even the touch screen with large size can be manufactured, the cost is sky high due to changes of the hardware standards.

SUMMARY OF THE INVENTION

The present invention is to provide a multi-touch system and a method for processing multi-touch signal which are capable of dynamically resizing the multi-touch system and greatly decreasing the cost of the multi-touch system with large size.

The invention provides a multi-touch system comprising a control device and a plurality of touch sensing sub-systems. The touch sensing sub-systems are arranged in a touch sensing row in sequence and are coupled to the control device respectively. The touch sensing row includes a pair of longitudinal sides opposite to each other and a pair of end sides opposite to each other and a light reflective frame is configured on one of the longitudinal sides and both of the end sides. Each of the touch sensing sub-systems comprises at least two sensors arranged at two corners of the corresponding touch sensing sub-system at one longitudinal side opposite to the other longitudinal side having the light reflective frame arranged thereon, wherein a sensing range of both of the sensor covers at least the corresponding touch sensing sub-system.

According to one embodiment of the present invention, in the touch sensing row, the light reflective frame is not arranged between the adjacent touch sensing sub-systems.

According to one embodiment of the present invention, the multi-touch system further comprises a plurality of displaying devices coupled to the touch sensing sub-systems respectively so that the displaying devices and the touch sensing sub-systems altogether forms a touch display system.

The invention also provides a multi-touch system comprising a control device and a plurality of touch sensing sub-system. The touch sensing sub-systems are arranged in an array with at least two touch sensing rows and are coupled to the control device respectively. Each of the touch sensing rows includes a pair of longitudinal sides opposite to each other and a pair of end sides opposite to each other and a light reflective frame is configured on one of the longitudinal sides and both of the end sides. Each of the touch sensing sub-systems in each of the touch sensing rows comprises at least two sensors arranged at two corners of the corresponding touch sensing sub-system at one longitudinal side opposite to the other longitudinal side having the light reflective frame arranged thereon, wherein a sensing range of both of the sensor covers at least the corresponding touch sensing sub-system.

According to one embodiment of the present invention, in each of the touch sensing rows, the light reflective frame is not arranged between the adjacent touch sensing sub-systems.

According to one embodiment of the present invention, the multi-touch system further comprises a plurality of displaying devices coupled to the touch sensing sub-systems respectively so that the displaying devices and the touch sensing sub-systems altogether forms a touch display system.

The invention further provides a method for processing a multi-touch signal, for a multi-touch system. The multi-touch system includes a plurality of touch sensing sub-systems arranged in a touch sensing row, and the touch sensing row includes a pair of longitudinal sides opposite to each other and a pair of end sides opposite to each other. A light reflective frame is configured on one of the longitudinal sides and both of the end sides and each of the touch sensing sub-systems includes at least two sensors arranged at two corners of the corresponding touch sensing sub-system at one longitudinal side opposite to the other longitudinal side having the light reflective frame arranged thereon. In the method, the sensors of each of the touch sensing sub-systems in the touch sensing row are initiated in sequence so as to receive a sensing signal from each of the touch sensing sub-systems. According to each of the sensing signals, it is determined whether a touch point number sensed by each of the sensors of the touch sensing sub-systems corresponding to the sensing signal is 1. As for each of the touch sensing sub-systems, when the touch point number sensed by each of the sensors of the corresponding touch sensing sub-system is 1, it is determined that there is a touch point in the corresponding touch sensing sub-system and a coordinate of the touch point in the corresponding touch sensing sub-system is calculated according to the corresponding sensing signal.

According to one embodiment of the present invention, as for each of the touch sensing sub-system, when not all of the touch point numbers respectively sensed by the sensors of the corresponding touch sensing sub-system is 1, the method further comprises determining whether the touch point number sensed by at least one of the sensors of the touch sensing sub-system is zero. When it is determined the touch point number sensed by at least one of the sensors of the touch sensing sub-system is zero, it is determined that there is no touch point within the touch sensing sub-system. When it is determined both of the touch point numbers respectively sensed by the sensors of the touch sensing sub-system are not zero, an excluding process is performed on the sensing signal from the corresponding touch sensing sub-system to determine there is a touch point within the corresponding touch sensing sub-system and to calculate a coordinate of the touch point in the corresponding touch sensing sub-system according to the corresponding sensing signal.

According to one embodiment of the present invention, when it is determined both of the touch point numbers respectively sensed by the sensors of the touch sensing sub-system are not zero, the sensing signal corresponding to the touch sensing sub-system comprises a plurality of signal peaks and the excluding process comprises: according to a signal strength threshold, eliminating a portion of the signal peaks each of which has a signal strength lower than the signal strength threshold and corresponding the signal peaks each of which has the signal strength higher than the signal strength threshold with the touch points within the corresponding touch sensing sub-system respectively.

According to one embodiment of the present invention, a sensing range of both of the sensor covers at least the corresponding touch sensing sub-system.

According to one embodiment of the present invention, in the touch sensing row, the light reflective frame is not arranged between the adjacent touch sensing sub-systems.

Accordingly, in the present invention, an extended and seamless multi-touch device is comprised of a plurality of touch sensing sub-systems and there is no reflective frame configured between the adjacent touch sensing sub-system. Moreover, the number of the touch sensing sub-system within the multi-touch system can be varied according to the practical requirements so as to adjust the whole size of the multi-touch system. Therefore, the practicability and the maneuverability of the multi-touch system are increased. Furthermore, the touch sensing sub-systems are composed to be a multi-touch system by changing the arrangement of the light reflective frames. Therefore, it is not necessary to redesign hardware and the resolution of the sensor for the touch system with large size. Hence, the cost for manufacturing the multi-touch system with large size can be decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
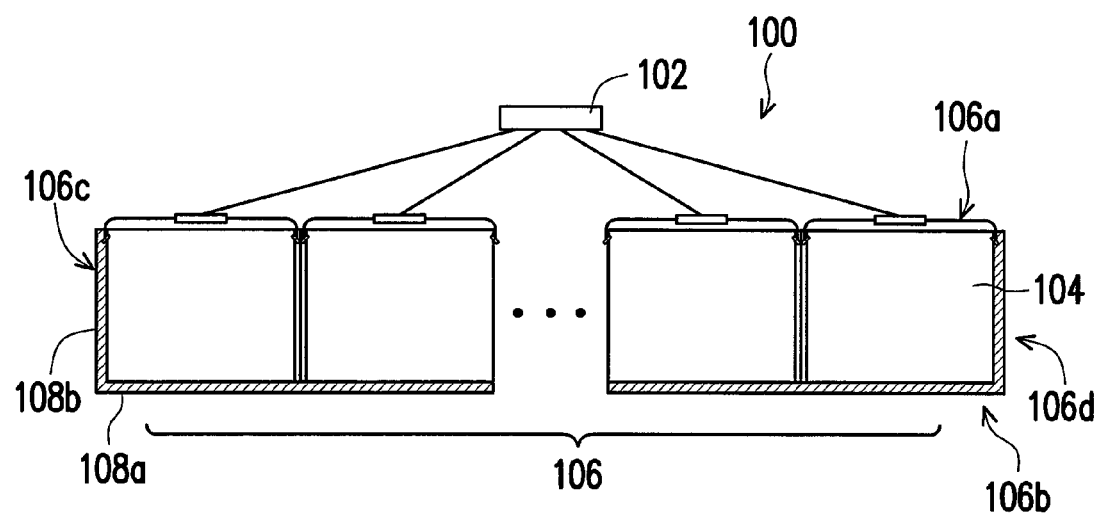
FIG. 1 is a schematic diagram showing a multi-touch system according to one embodiment of the present invention.

FIG. 1 is a schematic diagram showing a multi-touch system according to one embodiment of the present invention. As shown in FIG. 1, a multi-touch system 100 of the present embodiment comprises a control device 102 and a plurality of touch sensing sub-systems 104. The touch sensing sub-systems 104 are coupled to the control device 102 respectively and the control device 102 comprises a main control panel and a computer system for receiving sensing signals from the touch sensing sub-systems, calculating the position of the touch point on the touch sensing sub-systems and further performing the operations corresponding to the touch actions corresponding to the touch points.

The touch sensing sub-systems 104 are arranged in a touch sensing row 106 in sequence, wherein the touch sensing row 106 comprises a pair of longitudinal sides 106a and 106b opposite to each other and a pair of end sides 106c and 106d opposite to each other. It should be noticed that a light reflective frame 108a and 108b is configured on one of the longitudinal sides 106b (in the present embodiment, the longitudinal side 106b is taken as an example) and both of the end sides 106c and 106d. In the same touch sensing row 106, no light reflective frame is arranged between the adjacent touch sensing sub-systems 104. Hence, the whole touch sensing row 106 appears to be a seamless and extended multi-touch device. Moreover, the light reflective frame 108a on the longitudinal sides 106b is the stripe-type light reflective frame together formed by the light reflective frame on the corresponding side of each of the touch sensing sub-systems 104 in the touch sensing row 106, for example.

Figure 2:
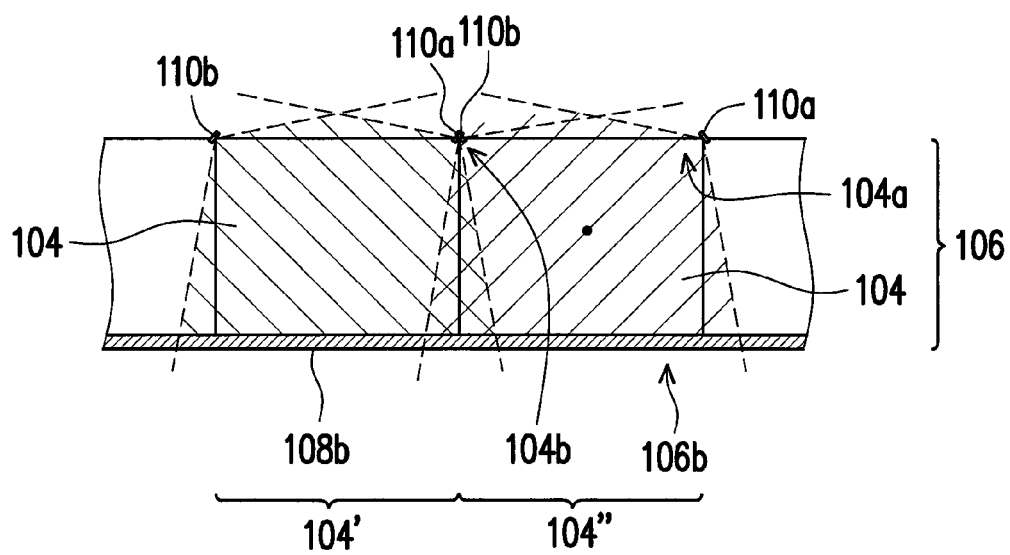
FIG. 2 is an enlargement of a plurality of touch sensing sub-systems in a touch sensing row of a multi-touch system according to one embodiment of the present invention.

FIG. 2 is an enlargement of a plurality of touch sensing sub-systems in a touch sensing row of a multi-touch system according to one embodiment of the present invention. As shown in FIG. 2, each of the touch sensing sub-systems 104 further comprises at least two sensors 110a and 110b respectively arranged at two corners 104a and 104b of the corresponding touch sensing sub-system at one longitudinal side opposite to the other longitudinal side having the light reflective frame 108b arranged thereon. The sensors 110a and 110b are, for example, the optical sensors which, by receiving the optical signals, sense whether there is touch actions in the corresponding touch sensing sub-system so as to generate the sensing signals. A joint sensing range of the sensors 110a and 110b (i.e. the sensing range circled by the dotted line and filled with oblique lines shown in FIG. 2) covers at least the corresponding touch sensing sub-system 104. Noticeably, since the light reflective frame 108b is configured on the longitudinal side 106b of the touch sensing row, the joint sensing range of the sensors 110a and 110b only extends to the light reflective frame 108b on the longitudinal side 106b of the touch sensing row and does not beyond the light reflective frame 108 to the infinite.

Moreover, in another embodiment, the multi-touch system further comprises a plurality of displaying devices coupled to the touch sensing sub-systems respectively so that the displaying devices and the touch sensing sub-systems altogether forms a touch display system.

Figure 3:
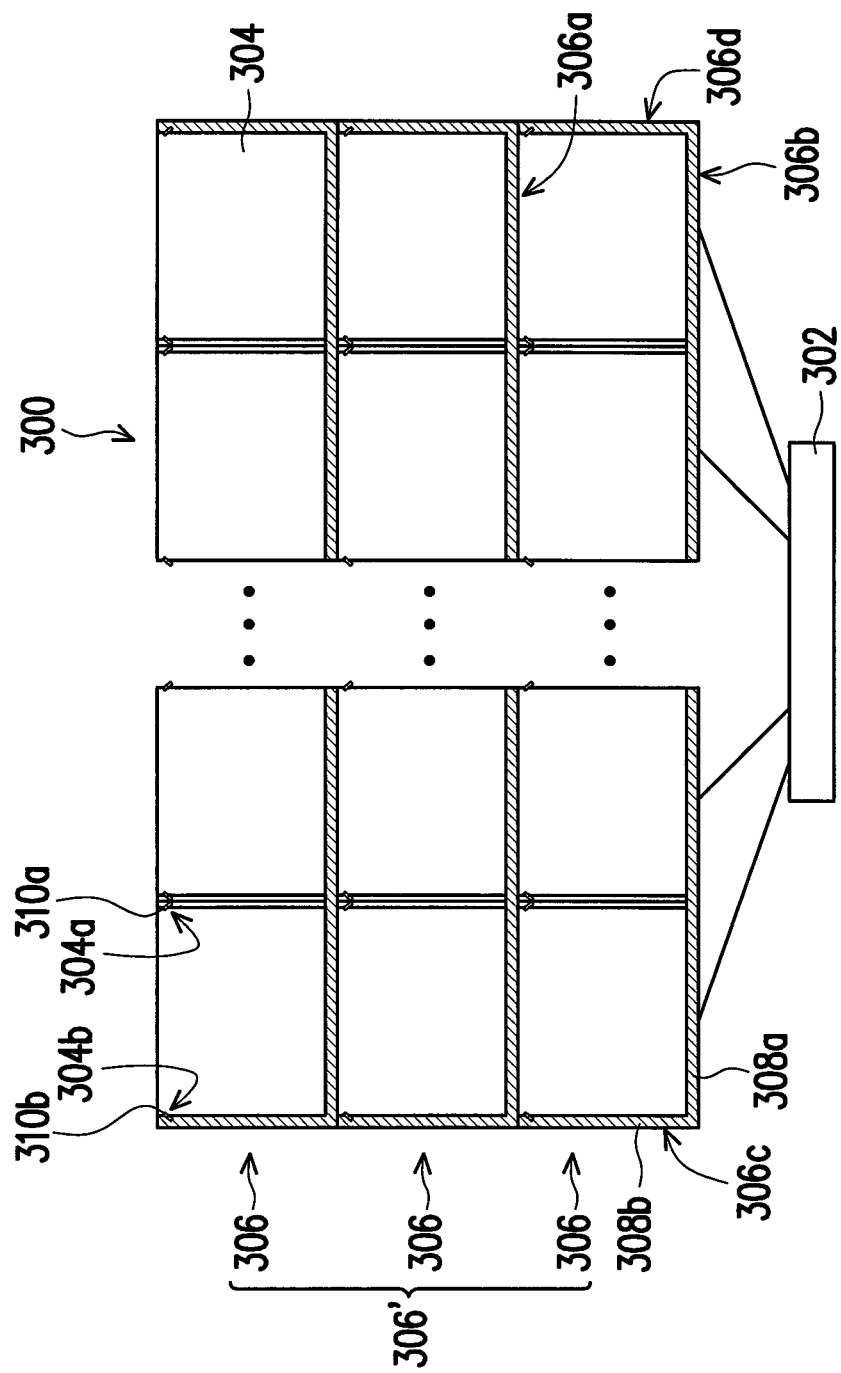
FIG. 3 is a schematic diagram showing a multi-touch system according to another embodiment of the present invention.

In the aforementioned embodiment, the plural touch sensing sub-systems are arranged into a touch row in sequence. However, the present invention is not limited thereto. That is, the multi-touch system of the present invention is not limited to a row of touch sensing sub-systems. FIG. 3 is a schematic diagram showing a multi-touch system according to another embodiment of the present invention. As shown in FIG. 3, a multi-touch system 300 comprises a plurality of touch sensing sub-systems 304 which are arranged in an array 306' comprising at least two touch sensing rows 306. Similar to the description of the previous embodiment, each of the touch sensing sub-systems coupled to the control device 302. Each of the touch rows 306 comprises a pair of longitudinal sides (306a and 306b) opposite to each other and a pair of end sides (306c and 306d) opposite to each other. A light reflective frame 308a and 308b is configured on one of the longitudinal sides 306b (in the present embodiment, the longitudinal side 306b is taken as an example) and both of the end sides 306c and 306d. The light reflective frame 308a on the longitudinal sides 306b is the stripe-type light reflective frame together formed by the light reflective frame on the corresponding side of each of the touch sensing sub-systems 304 in the touch sensing row 306, for example.

Each of the touch sensing sub-systems comprises at least two sensors 310a and 310b respectively arranged at two corners 304a and 304b of the corresponding touch sensing sub-system at one longitudinal side opposite to the other longitudinal side having the light reflective frame 308b arranged thereon. The types of the sensors 310a and 310b and the sensing ranges of the sensors 310a and 310b are described in the previous embodiments and are not detailed herein. Moreover, each of the touch sensing rows 306 are arranged to be aligned to each other so as to form the array 306'. More clearly, in the array 306', under the circumstance that the correlative positions of the sensors and the light reflective frame of each of the touch sensing rows 306 are the same, the array 306' of the multi-touch system are composed of at least two touch sensing rows 306.

Figure 4:
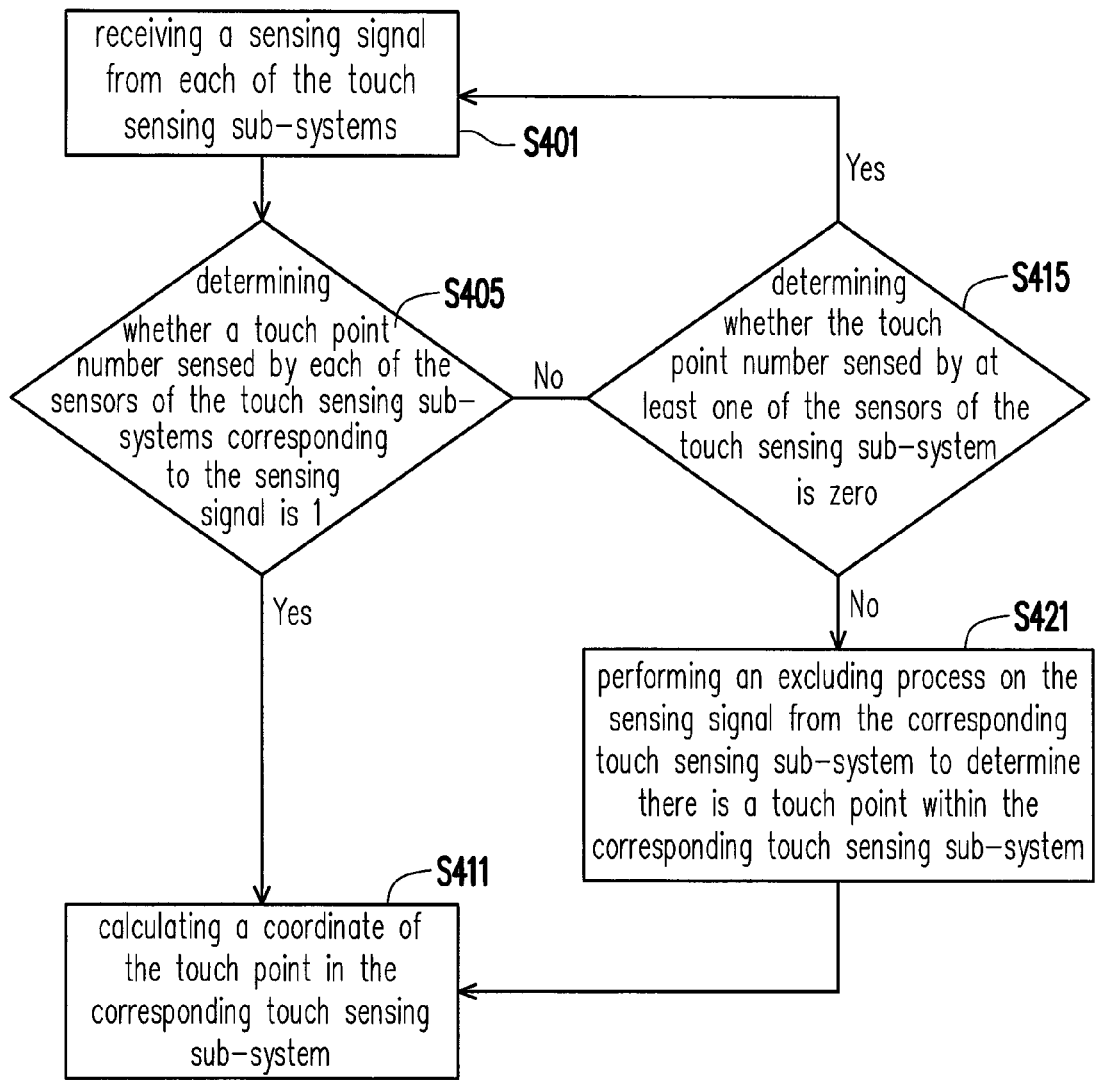
FIG. 4 is a flow chart illustrating a method for processing a multi-touch signal according to one embodiment of the present invention.

FIG. 4 is a flow chart illustrating a method for processing a multi-touch signal according to one embodiment of the present invention. As shown in FIG. 4, in the present embodiment, the method for processing the touch signal can be used on any one of the multi-touch system (100 or 300) illustrated in the previous embodiments. In the step S401, the sensors (110a and 110b, or 310a and 310b) of each of the touch sensing sub-systems in a single touch sensing row (106 or 306) in sequence in a scanning initiation mode so as to receive the sensing signals from each of the touch sensing sub-systems. The sensing signal received from a single touch sensing sub-system can be, for example, a complex sensing signal composed of several sensing signals. That is, when the sensor senses more than one touch action within its sensing range, the sensing signals are generated with a sensing signal number corresponding to the number of the touch actions.

In the step S405, according to each of the sensing signals, it is determined whether a touch point number sensed by each of the sensors of the touch sensing sub-systems corresponding to the sensing signal is 1. In other words, it is determined whether the sensors of a single touch sensing sub-system sense only one touch point within the corresponding touch sensing sub-system. In the step S411, thereafter, when the touch point number sensed by each of the sensors of the corresponding touch sensing sub-system is 1, it is determined that there is a touch point in the corresponding touch sensing sub-system and, according to the corresponding sensing signal, (i.e. the sensing signal transmitted to the control device by the sensors of the single touch sensing sub-system), a coordinate of the touch point in the corresponding touch sensing sub-system is calculated. The sensing signal comprises a horizontal coordinate (X) of the touch point and a vertical coordinate (Y) of the touch point within the single touch sensing sub-system and the position of the single touch sensing sub-system in the touch sensing row which are sensed by the two sensors of the corresponding touch sensing sub-system so that the absolute coordinate of the touch point in the whole touch sensing row can be calculated.

Then, in the step S415, when not all of the touch point numbers respectively sensed by the sensors of the corresponding touch sensing sub-system is 1, it is determined whether the touch point number sensed by at least one of the sensors of the touch sensing sub-system is zero. That is, when the sensors in the same touch sensing sub-system sense the touch point numbers different from each other, it is determined whether there is indeed a touch point of the touch action existing in the single touch sensing sub-system by determining whether the touch point number sensed by at least one of the sensors of the single touch sensing sub-system is zero. When it is determined the touch point number sensed by at least one of the sensors of the touch sensing sub-system is zero, it is determined there is no touch point within the touch sensing sub-system and then the procedure of the method is back to the step S401 to wait for another process run in which the sensors of each of the touch sensing sub-systems in the single touch sensing row are initiated in sequence in the scanning initiation mode for generating the sensing signals sequentially.

Figure 5A:
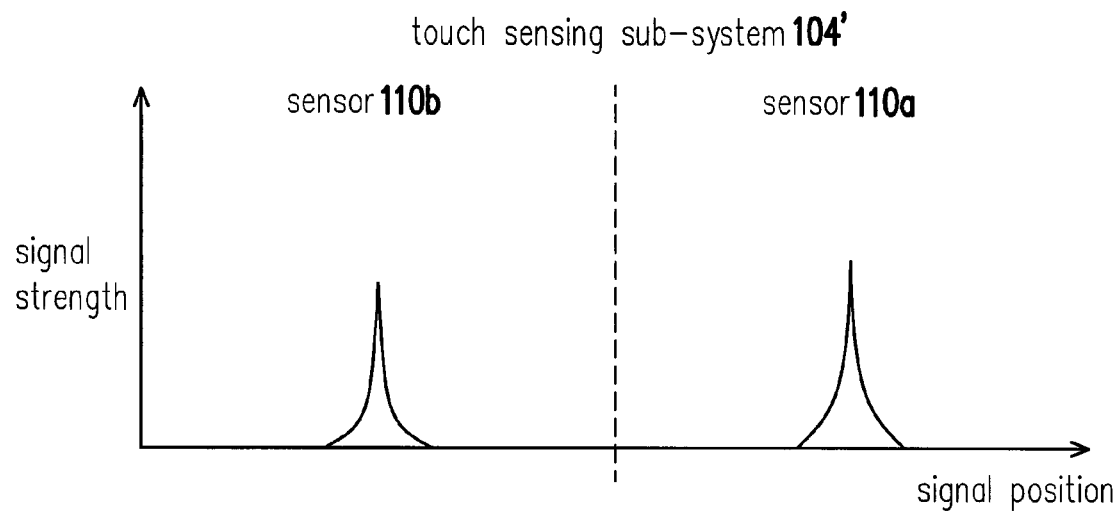
FIG. 5A is a signal strength versus signal position diagram for illustrating a sensing signal generated by a sensor of a single touch sensing sub-system 104' sensing a touch point according to one embodiment of the present invention.

For instance, as shown in FIG. 2, when the touch point of the touch action is within the touch sensing sub-system 104' and there is no touch point in the touch sensing sub-system 104", the touch number sensed by each of the sensors 110a and 110b of the touch sensing sub-system 104' is one according to the sensing signal transmitted by the sensors 110a and 110b of the touch sensing sub-system 104'. As shown in FIG. 5A, a signal strength versus signal position diagram for illustrating a sensing signal generated by a sensor of a single touch sensing sub-system 104' sensing a touch point according to one embodiment of the present invention, the sensors 110a and 110b of the touch sensing sub-system 104' respectively sense the touch action so as to generate a sensing signal (i.e. a sensing signal peak). Therefore, it is determined there is a touch point of the touch action within the touch sensing sub-system 104'.

Figure 5B:
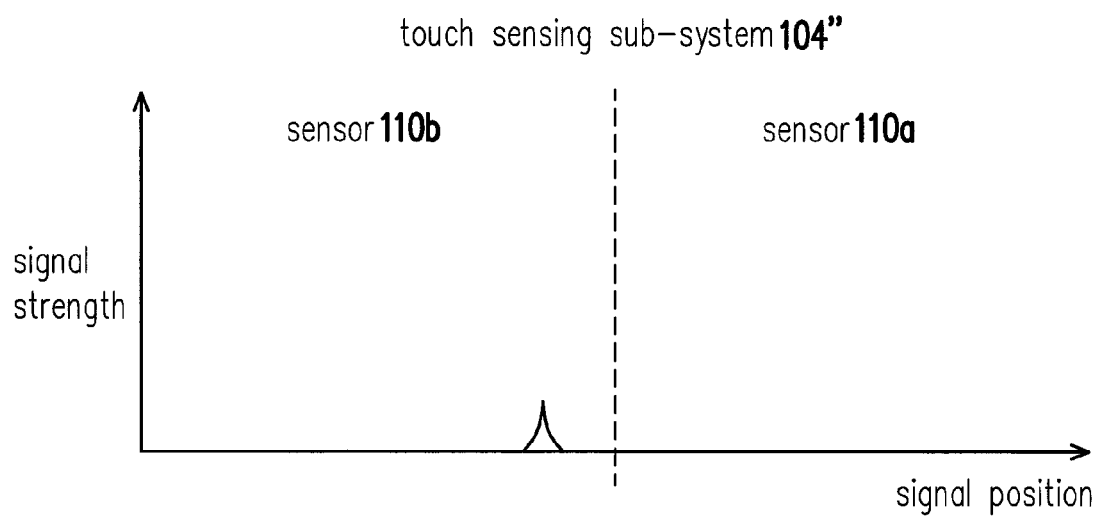
FIG. 5B is a signal strength versus signal position diagram for illustrating a sensing signal generated by a sensor of a single touch sensing sub-system 104" sensing a touch point according to one embodiment of the present invention.

However, as shown in FIG. 5B, a signal strength versus signal position diagram for illustrating a sensing signal generated by a sensor of a single touch sensing sub-system 104" sensing a touch point according to one embodiment of the present invention, the touch point in the touch sensing sub-system 104' is not within the sensing range of the sensor 110a of the touch sensing sub-system 104" so that the sensor 110a of the touch sensing sub-system 104" does not sense any touch action and there is no sensing signal shown in the signal strength versus signal position diagram. Since there is no light reflective frame arranged between the adjacent touch sensing sub-systems 104' and 104" to block the optical signal irradiated from the sensors, the sensor of the touch sensing sub-system 104" still can senses the touch point which is located in its extended sensing range and in the adjacent touch sensing sub-system. More specifically, since the touch point within the touch sensing sub-system 104' is also located within the sensing range of the sensor 110b of the touch sensing sub-system 104", the sensor 110 of the touch sensing sub-system 104" can sense the touch action which generates the touch point and a sensing signal with a relative weak signal strength is shown in the signal strength versus signal position diagram. Apparently, through the sensing signals sensed by the sensors 110a and 110b of the touch sensing sub-system 104" shown in FIG. 5B, the touch point does not occurs in the touch sensing sub-system 104".

Thereafter, in the step S421 after the step S415, when it is determined both of the touch point numbers respectively sensed by the sensors of the touch sensing sub-system are not zero, an excluding process is performed on the sensing signal from the corresponding touch sensing sub-system to determine there is a touch point within the corresponding touch sensing sub-system. Then, in the step S411, according to the corresponding sensing signal, a coordinate of the touch point in the corresponding touch sensing sub-system is calculated.

Figure 6A:
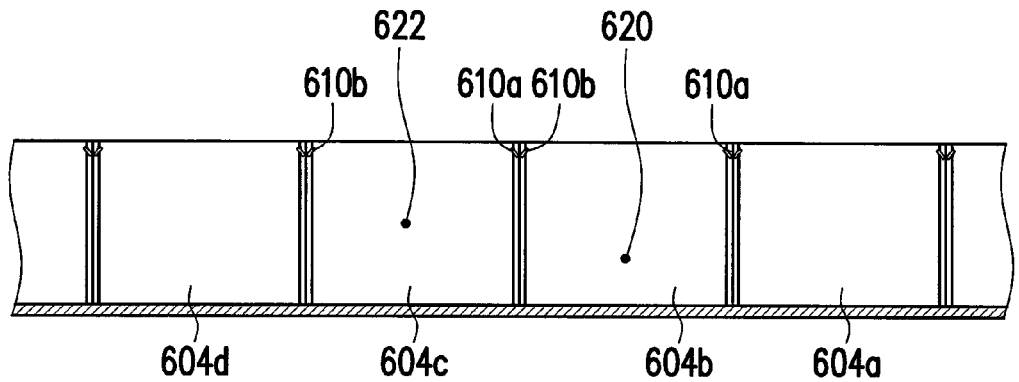
FIG. 6A is an enlargement of a plurality of touch sensing sub-systems in a touch sensing row of a multi-touch system according to one embodiment of the present invention.
Figure 6B:
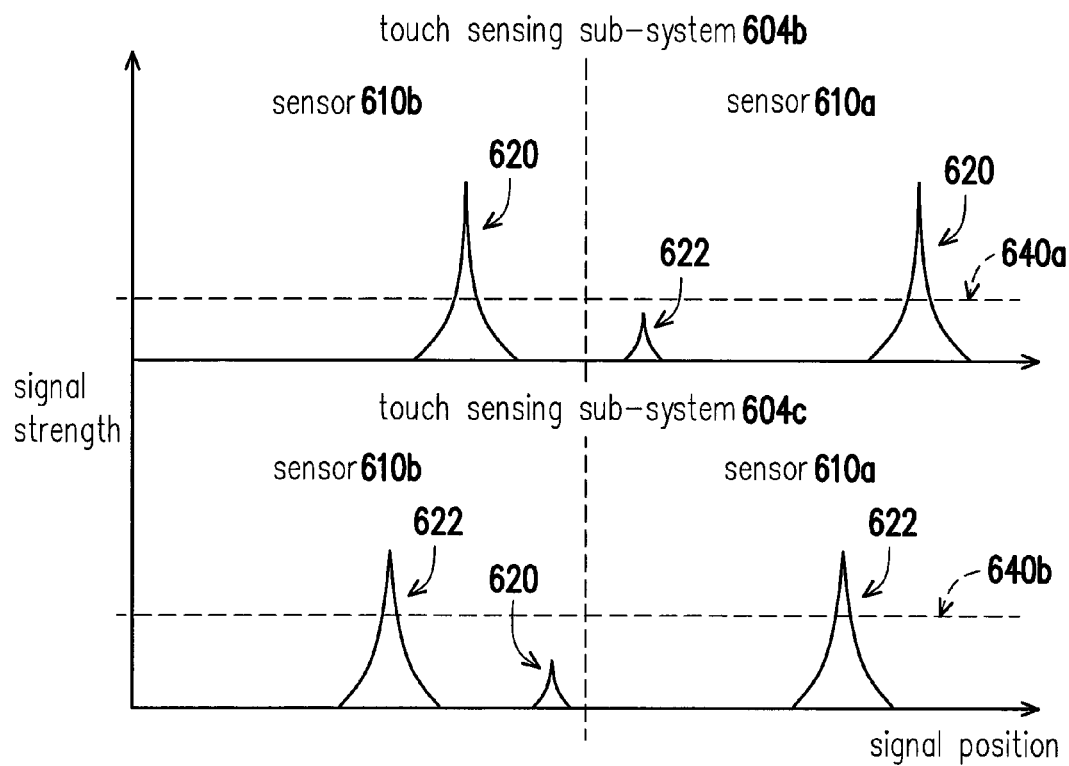
FIG. 6B is a signal strength versus signal position diagram for illustrating sensing signals generated by sensors of touch sensing sub-systems 604b and 604c sensing a touch point according to one embodiment of the present invention.

FIG. 6A is an enlargement of a plurality of touch sensing sub-systems in a touch sensing row of a multi-touch system according to one embodiment of the present invention. FIG. 6B is a signal strength versus signal position diagram for illustrating sensing signals generated by sensors of touch sensing sub-systems 604b and 604c sensing a touch point according to one embodiment of the present invention. As shown in FIGS. 6A and 6B, when the touch points 620 and 622 are respectively located within the adjacent touch sensing sub-systems 604b and 604c and there is no touch point within in both of the touch sensing sub-systems 604a and 604d, the signal strength versus signal position diagram reflecting the situation of the adjacent touch sensing sub-systems 604b and 604c is shown in FIG. 6B. That is, the sensor 610a of the touch sensing sub-system 604b senses both of the touch points 620 and 622 and the sensor 610b of the touch sensing sub-system 604b only senses the touch point 620. Similarly, the sensor 610b of the touch sensing sub-system 604c senses both of the touch point 620 and 622 and the sensor 610a of the touch sensing sub-system 604c only senses the touch point 622.

Therefore, according to a signal strength threshold (such as the dotted lines 640a and 640b shown in FIG. 6B), when the excluding process is performed, a portion of the signal peaks each of which has a signal strength lower than the signal strength threshold (such as the signal peak of the touch point 622 sensed by the sensor 610a of the touch sensing sub-system 604b and the signal peak of the touch point 620 sensed by the sensor 610b of the touch sensing sub-system 604c shown in FIG. 6B) is eliminated. Further, the signal peaks each of which has the signal strength higher than the signal strength threshold is corresponded with the touch points within the corresponding touch sensing sub-system respectively. The signal strength threshold is set according to the touch sensing signal strength at the border of the touch sensing sub-system when a touch sensing signal test is performed at the border of each of the touch sensing sub-systems at the initial stage for assembling the multi-touch system. When the sensing signal strength is lower than the signal strength threshold, it is determined the sensing signal is generated by the sensor sensing the touch point within the adjacent touch sensing sub-system and not within the corresponding touch sensing sub-system.

Altogether, in the present invention, an extended and seamless multi-touch device is comprised of a plurality of touch sensing sub-systems and there is no reflective frame configured between the adjacent touch sensing sub-system. Moreover, the number of the touch sensing sub-system within the multi-touch system can be varied according to the practical requirements so as to adjust the whole size of the multi-touch system. Therefore, the practicability and the maneuverability of the multi-touch system are increased. Furthermore, the touch sensing sub-systems are composed to be a multi-touch system by changing the arrangement of the light reflective frames. Therefore, it is not necessary to redesign hardware and the resolution of the sensor for the touch system with large size. Hence, the cost for manufacturing the multi-touch system with large size can be decreased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A multi-touch system, comprising:
    a control device; and
    a plurality of touch sensing sub-systems arranged in a touch sensing row in sequence and coupled to the control device respectively, wherein the touch sensing row includes a pair of longitudinal sides opposite to each other and a pair of end sides opposite to each other and a light reflective frame is configured on one of the longitudinal sides and both of the end sides and each of the touch sensing sub-systems comprises:
        at least two sensors arranged at two corners of the corresponding touch sensing sub-system at one longitudinal side opposite to the other longitudinal side having the light reflective frame arranged thereon, wherein a sensing range of the at least two sensors covers the corresponding touch sensing sub-system and adjacent touch sensing sub-systems of the corresponding touch sensing sub-system,
    wherein the control device initiates the sensors of each of the touch sensing sub-systems in the touch sensing row in sequence so as to receive a sensing signal from each of the touch sensing sub-systems, wherein the control device determines whether a touch point number sensed by each of the sensors of the touch sensing sub-systems corresponding to the sensing signal is more than one according to each of the sensing signals, wherein when the touch point number sensed by each of the sensors of the corresponding touch sensing sub-system is one, the touch sensing device determines that there is a touch point in the corresponding touch sensing sub-system and calculates a coordinate of the touch point in the corresponding touch sensing sub-system according to the corresponding sensing signal, as for each of the touch sensing sub-system, when not all of the touch point numbers respectively sensed by the sensors of the corresponding touch sensing sub-system is one: determining whether the touch point number sensed by at least one of the sensors of the touch sensing sub-system is zero;

when it is determined the touch point number sensed by at least one of the sensors of the touch sensing sub-system is zero, determining there is no touch point within the touch sensing sub-system;

as for each of the touch sensing sub-system, when at least one of the sensors of the touch sensing sub-system is not zero, and the touch point number sensed by one of the sensors of the corresponding touch sensing sub-system is more than one, the touch sensing device performs an excluding process on the sensing signal according to a signal strength threshold, wherein the signal strength threshold is set according to the touch sensing signal strength at the border of the touch sensing sub-system.

2. The multi-touch system of claim 1, wherein, in the touch sensing row, the light reflective frame is not arranged between the adjacent touch sensing sub-systems.

3. The multi-touch system of claim 1, further comprising a plurality of displaying devices coupled to the touch sensing sub-systems respectively so that the displaying devices and the touch sensing sub-systems altogether forms a touch display system.

4. A multi-touch system, comprising:
a control device; and
a plurality of touch sensing sub-systems arranged in an array with at least two touch sensing rows and coupled to the control device respectively, wherein each of the touch sensing rows includes a pair of longitudinal sides opposite to each other and a pair of end sides opposite to each other and a light reflective frame is configured on one of the longitudinal sides and both of the end sides and each of the touch sensing sub-systems in each of the touch sensing rows comprises:
at least two sensors arranged at two corners of the corresponding touch sensing sub-system at one longitudinal side opposite to the other longitudinal side having the light reflective frame arranged thereon, wherein a sensing range of the at least two sensors cover the corresponding touch sensing sub-system and adjacent touch sensing sub-systems of the corresponding touch sensing sub-system,
wherein the control device initiates the sensors of each of the touch sensing sub-systems in the touch sensing row in sequence so as to receive a sensing signal from each of the touch sensing sub-systems,
wherein when the touch point number sensed by each of the sensors of the corresponding touch sensing sub-system is one, the touch sensing device determines that there is a touch point in the corresponding touch sensing sub-system and calculates a coordinate of the touch point in the corresponding touch sensing sub-system according to the corresponding sensing signal, when not all of the touch point numbers respectively sensed by the sensors of the corresponding touch sensing sub-system is one:
the control device determines whether the touch point number sensed by at least one of the sensors of the touch sensing sub-system is zero;
when the control device determines the touch point number sensed by at least one of the sensors of the touch sensing sub-system is zero, the control device determines that there is no touch point within the touch sensing sub-system;
wherein the control device determines whether the touch point number sensed by at least one of the sensors of the touch sensing sub-system is not zero, and according to each of the sensing signals, wherein when the touch point number sensed by one of the sensors of the corresponding touch sensing sub-system is more than one, the touch sensing device performs an excluding process on the sensing signal according to a signal strength threshold, wherein the signal strength threshold is set according to the touch sensing signal strength at the border of the touch sensing sub-system.

5. The multi-touch system of claim 4, wherein, in each of the touch sensing rows, the light reflective frame is not arranged between the adjacent touch sensing sub-systems.

6. The multi-touch system of claim 4, further comprising a plurality of displaying devices coupled to the touch sensing sub-systems respectively so that the displaying devices and the touch sensing sub-systems altogether forms a touch display system.

7. A method for processing a multi-touch signal, for a multi-touch system, wherein the multi-touch system includes a plurality of touch sensing sub-systems arranged in a touch sensing row, the touch sensing row includes a pair of longitudinal sides opposite to each other and a pair of end sides opposite to each other, a light reflective frame is configured on one of the longitudinal sides and both of the end sides and each of the touch sensing sub-systems includes at least two sensors arranged at two corners of the corresponding touch sensing sub-system at one longitudinal side opposite to the other longitudinal side having the light reflective frame arranged thereon, a sensing range of the at least two sensors covers the corresponding touch sensing sub-system and adjacent touch sensing sub-systems of the corresponding touch sensing sub-system, the method comprising:
initiating the sensors of each of the touch sensing sub-systems in the touch sensing row in sequence so as to receive a sensing signal from each of the touch sensing sub-systems;
according to each of the sensing signals, determining whether a touch point number sensed by each of the sensors of the touch sensing sub-systems corresponding to the sensing signal is more than one;
when the touch point number sensed by each of the sensors of the corresponding touch sensing sub-system is one, determining there is a touch point in the corresponding touch sensing sub-system and calculating a coordinate of the touch point in the corresponding touch sensing sub-system according to the corresponding sensing signal;
as for each of the touch sensing sub-system, when not all of the touch point numbers respectively sensed by the sensors of the corresponding touch sensing sub-system is one:

determining whether the touch point number sensed by at least one of the sensors of the touch sensing sub-system is zero;

when it is determined that the touch point number sensed by at least one of the sensors of the touch sensing sub-system is zero, determining there is no touch point within the touch sensing sub-system;

as for each of the touch sensing sub-systems, when it is determined that the touch point number sensed by at least one of the sensors of the touch sensing is not zero, and when the touch point number sensed by a sensor of the corresponding touch sensing sub-system is more than one, performing an excluding process on the sensing signal from the corresponding touch sensing sub-system according to a signal strength threshold, wherein the signal strength threshold is set according to the touch sensing signal strength at the border of the touch sensing sub-system.

8. The method of claim 7, wherein when it is determined both of the touch point numbers respectively sensed by the sensors of the touch sensing sub-system are not zero, the sensing signal corresponding to the touch sensing sub-system comprises a plurality of signal peaks and the excluding process comprises:

according to a signal strength threshold, eliminating a portion of the signal peaks each of which has a signal al strength lower than the signal strength threshold and corresponding the signal peaks each of which has the signal strength higher than the signal strength threshold with the touch points within the corresponding touch sensing sub-system respectively.

9. The method of claim 7, wherein, in the touch sensing row, the light reflective frame is not arranged between the adjacent touch sensing sub-systems.

* * * * *